United States Patent [19]
Schlueter, Jr. et al.

[11] Patent Number: 5,656,720
[45] Date of Patent: *Aug. 12, 1997

[54] HIGH WEAR RESISTANCE LOW COMPRESSION SET POLYURETHANE

[75] Inventors: Edward L. Schlueter, Jr., Rochester; James F. Smith, Ontario; Lucille M. Sharf, Pittsford, all of N.Y.

[73] Assignee: Xerox Corporation, Stamford, Conn.

[*] Notice: The portion of the term of this patent subsequent to Oct. 20, 2009, has been disclaimed.

[21] Appl. No.: 767,442

[22] Filed: Sep. 30, 1991

[51] Int. Cl.$^6$ .................................................. C08G 18/10
[52] U.S. Cl. .................................................. 528/60; 528/76
[58] Field of Search .................................................. 528/60, 76

[56] References Cited

U.S. PATENT DOCUMENTS

| | | | |
|---|---|---|---|
| 2,899,411 | 8/1959 | Schollenberger | 528/76 |
| 2,901,467 | 8/1959 | Croco | 528/76 |
| 4,451,622 | 5/1984 | DiDomenico, Jr. | 525/456 |
| 4,519,698 | 5/1985 | Kohyama et al. | 355/15 |
| 4,543,405 | 9/1985 | Ambrose et al. | 528/78 |
| 4,739,027 | 4/1988 | Mendelsohn et al. | 528/77 |
| 4,823,161 | 4/1989 | Yamada et al. | 355/15 |
| 4,958,197 | 9/1990 | Kinashi et al. | 355/299 |

OTHER PUBLICATIONS

J. H. Saunders and K. C. Frisch; *Polyurethanes;* 1962; p. 311.

*Primary Examiner*—Rachel Gorr
*Attorney, Agent, or Firm*—Samuel E. Mott; Arnette L. Bade

[57] ABSTRACT

A polyurethane elastomer obtained by the reaction of a polytetramethylene ether glycol having the formula HO[$(CH_2)_4O]_nH$ where n is from 10 to 60, preferably 55 to 60, and from about 20 to about 95 parts preferably 22 to 26 parts, by weight per 100 parts by weight of said glycol of a diisocyanate selected from the group consisting of diphenylmethane diisocyanates, toluene diisocyanates, naphthalene diisocyanates and blends thereof and a sufficient amount of cross linking agents to provide a crosslinked elastomer, said cross linking agents comprising a mixture of from about 75% to 60% by weight of a diol having the formula HO($R_1$) OH where $R_1$ is a straight or branched chain alkyl group having from 2 to 12 carbon atoms and from about 25% to 40% by weight of a triol having the formula R'—C—[$(OH)_a(CH_2OH)_b$] where R' is H, $CH_3$ or $C_2H_5$, a is 0 or 1, b is 2 or 3 and a+b=3.

13 Claims, 3 Drawing Sheets

HIGH WEAR RESISTANCE LOW COMPRESSION SET POLYURETHANE

CROSS REFERENCE TO RELATED APPLICATIONS

Attention is directed to the following U.S. patent applications filed concurrently herewith. U.S. patent application Ser. No. 07/767,432, now U.S. Pat. No. 5,157,098 entitled Cleaning Apparatus in the name of Nero R. Lindblad et al, U.S. application Ser. No. 07/767,431; now U.S. Pat. No. 5,142,016 entitled Sheet Handling Scuffer Paddle Wheel in the name of Lucille M. Sharf et al, U.S. application Ser. No. 07/767,711, now U.S. Pat. No. 5,468,834 entitled Sheet Registration Device in the name of Robert Finsterwalder et al, and U.S. application Ser. No. 07/767,441, now U.S. Pat. No. 5,194,558 entitled Disk Stacker With Novel Paddle Wheel Wiper in the name of Richard Carlston et al.

BACKGROUND OF THE INVENTION

The present invention is directed to a novel polyurethane elastomer composition having high wear resistance and low compression set characteristics. It has particular application in an electrostatographic printing apparatus and in particular as a cleaning blade in cleaning an electrostatographic imaging surface.

In the process of electrophotographic printing, a photoconductive surface is charged to a substantially uniform potential. The photoconductive surface is image wise exposed to record an electrostatic latent image corresponding to the informational areas of an original document being reproduced. This records an electrostatic latent image on the photoconductive surface corresponding to the informational areas contained within the original document. Thereafter, a developer material is transported into contact with the electrostatic latent image. Toner particles are attracted from the carrier granules of the developer material onto the latent image. The resultant toner powder image is then transferred from the photoconductive surface to a sheet of support material and permanently affixed thereto.

This process is well known and useful for light lens copying from an original and printing application from electronically generated or stored originals, and in ionography.

In a reproduction process of the type as described above, it is inevitable that some residual toner will remain on the photoconductive surface after the toner image has been transferred to the sheet of support material (e.g. paper). It has been found with such a process that the forces holding some of the toner particles to the imaging surface are stronger than the transfer forces and, therefore, some of the particles remain on the surface after transfer of the toner image. In addition to the residual toner, other particles, such as paper debris (i.e. kaolin, fibers, clay), additives and plastic, are left behind on the surface after image transfer. The residual particles adhere firmly to the surface and must be removed prior to the next printing cycle to avoid its interfering with recording a new latent image thereon.

Various methods and apparatus may be used for removing residual particles from the photoconductive imaging surface. Heretofore, cleaning brushes, and cleaning webs have been used. Both cleaning brushes and cleaning webs operate by wiping the surface so as to affect transfer of the residual particles from the imaging surface. After prolonged usage, however, both of these types of cleaning devices become contaminated with toner and must be replaced. This requires discarding the dirty cleaning devices. In high-speed machines this practice has proven not only to be wasteful but also expensive.

Another more widely used device for cyclically cleaning residual toner and other debris from an electrostatographic imaging surface is a cleaning blade which may be used in either the chisel or wiper orientation relative to the imaging surface. Typically, blade cleaning systems are very much less expensive than brush cleaning systems. Such cleaning blades are typically made from non-abrasive flexible elastomeric materials such as polyurethane rubbers. While capable of performing adequately they suffer certain deficiencies, particularly with respect to the variation in their mechanical properties with changes in temperature and relative humidity. The mechanical properties such as resiliency, compression set and tensile set are dynamic properties varying with changes in temperature and relative humidity, thereby, providing unstable cleaning performance. For example, swings in temperature can have a significant dynamic effect on cleaning blade edge performance which is magnified by the frictional heating of the portion of the blade edge riding on the imaging surface or the mere presence or absence of toner on the imaging surface which provide different levels of friction and thereby heating. Furthermore, typical conventional polyester polyurethane blades tend to take a compression set of up to 25 percent after only 24 to 48 hours of frictional contact with the imaging surface which alters the functional set of design parameters of the blade as it relates to the imaging surface such as the attack angle and force of the blade edge relative to the imaging surface. In addition, conventional polyurethanes tend to suffer a wearing deficiency by being susceptible to gouging on the blade edge leading to non-uniform cleaning of the imaging surface and resulting in streaks on the imaging surface and ultimately streaks in the final copy or print. Accordingly, there is a need for an improved material having a more stable response in mechanical properties, particularly resiliency, to variations in temperature and relative humidity and in particular, having better wear and compression set characteristics in cleaning blade applications in electrostatographic apparatus.

PRIOR ART

U.S. Pat. No. 4,823,161 to Yamada et al. describes a cleaning blade design which has a double-layer structure comprising a contact member made of a poly(urethane) ureamide polymer held in contact with a toner image bearing member surface, and a support member for the contact member which has the same hardness or essentially the same hardness as the contact member and is lower than the contact member in glass transition temperature.

SUMMARY OF THE INVENTION

In accordance with the principle aspect of the present invention a polyurethane elastomer more stable in mechanical properties in response to variations in temperature and relative humidity is provided. In a further specific aspect of the present invention the type and amount of cross linking agents for the elastomer are selected to provide better wear and compression set characteristics.

In a further aspect of the present invention the polyurethane elastomer is obtained by the reaction of a polytetramethylene ether glycol having the formula $HO[(CH_2)_4O]_nH$ wherein n is from 8 to 41, and from about 20 to about 95 parts by weight per 100 parts by weight of the glycol of a diisocyanate selected from the group of diphenylmethane diisocyanates, toluene diisocyanates, naphthalene diisocyanates and blends thereof and a sufficient amount of crosslinking agents to provide a cross linked elastomer, the crosslinking agents comprising a mixture of from about 75% to 60% weight of a diol having the formula $HO(R_1)OH$ where $R_1$ is a straight or branched chain alkyl group having 2 to 12 carbon atoms and from about 25% to 40% weight of a triol having the formula:

where R' is H, $CH_3$ or $C_2H_5$, a is 0 or 1, b is 2 or 3 and a+b=3.

In a further aspect of the present invention the elastomer is prepared by first forming a prepolymer of the polytetramethylene ether glycol and the diisocyanate followed by the addition of both crosslinking agents to the prepolymer.

In a further aspect of the present invention the elastomer is prepared by adding all of the recited reactive constituents including the crosslinking agents to a reaction vessel at the same time.

In a further aspect of the present invention the mixture of crosslinkers is present in an amount of from about 4 to 18 parts by weight per 100 parts by weight of the glycol and preferably from about 4 to 6 parts by weight for the higher molecular weight glycols.

In a further aspect of the present invention the crosslinker is a mixture of about 75% weight of 1,4 butanediol and 25% weight trimethylolpropane.

In a further aspect of the present invention the crosslinker is a mixture of about 60% weight, 1,4 butanediol and 40% weight trimethylolpropane.

In a further aspect of the present invention n is from 39 to 41 parts by weight and the diisocyanate is present in an amount of from about 22 to 26 parts by weight per 100 parts by weight of the glycol.

In a further aspect of the present invention the diisocyanate is selected from the group of diphenyl methane diisocyanates and in a preferred embodiment is a blend of 4,4' diphenylmethane diisocyanate and 2,4'diphenylmethane diisocyanate.

For a better understanding as well as other objects and further features thereof, reference is made to the following drawings and descriptions.

DESCRIPTION OF PREFERRED EMBODIMENT

Figure 1:
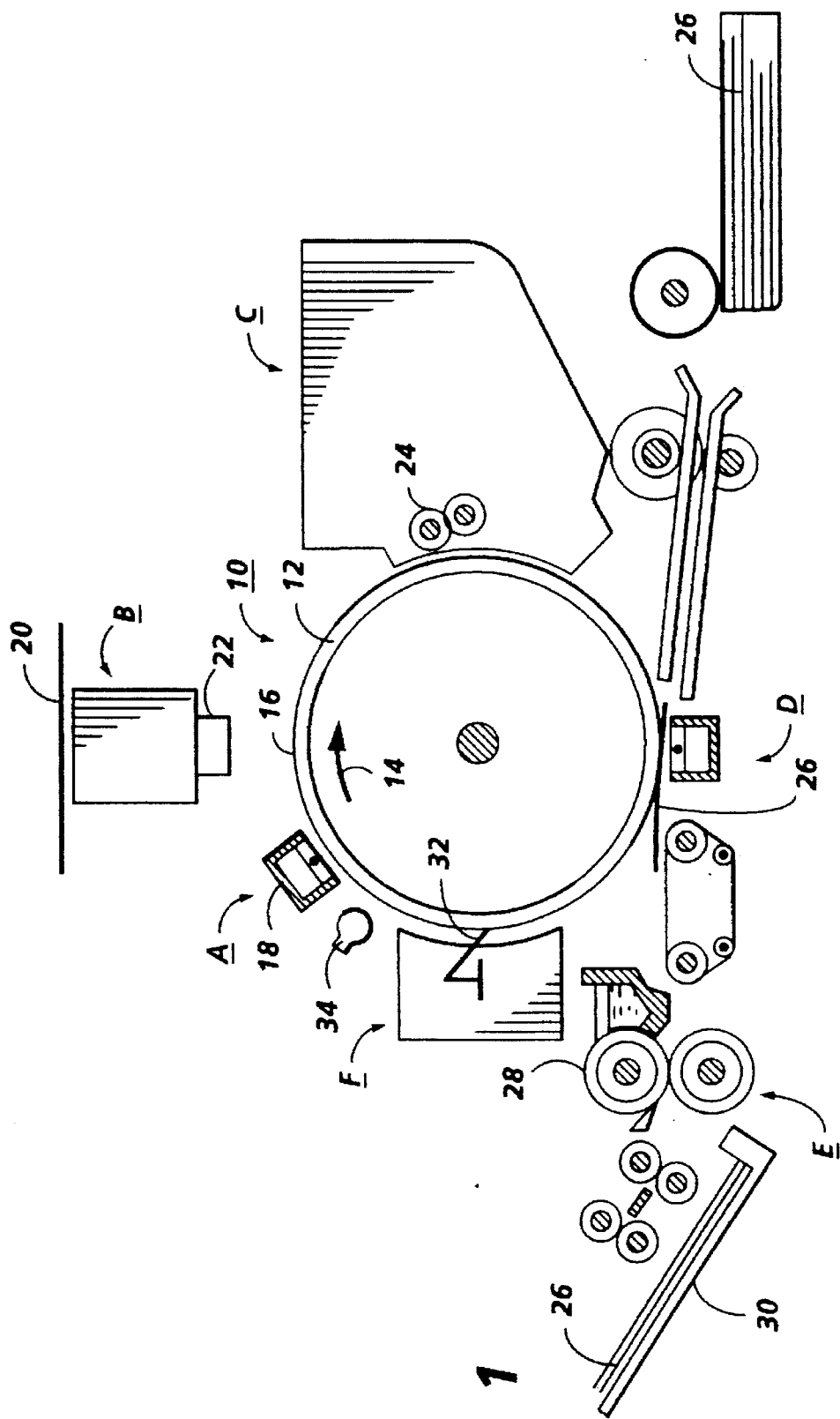
FIG. 1 is a schematic representation in cross-section for an electrostatographic printing apparatus which may incorporate the polyurethane elastomer according to the present invention as a cleaning blade.

Referring now to FIG. 1, which schematically depicts the various components of a typical electrostatographic printing machine 10. Since the practice of electrostatographic printing is well known, the various processing stations for producing a print or copy, will be described in brief detail. FIG. 1 illustrates an imaging drum 12, rotatable in the direction of the arrow 14, which has a photoconductive insulating layer 16 on a conductive substrate. The photoconductive insulating surface is charged to a suitable potential at station A by a corona generating device 18 after which it is exposed to a light and shadow image at exposure station B which is typically accomplished by illuminating an original document 20 with lamps and reflecting light from the white or non-imaging background areas of the document through the lens 22 onto the charged photoconductive insulating layer to discharge it in the exposed areas creating an electrostatic latent image on the surface of the drum. Alternatively, the electrostatic latent image may be electronically created by the exposure of the charged photoconductive insulating layer to a laser beam which is turned on and off in accordance with electronically captured or stored information.

Next, the electrostatic latent image is developed at development station C, which includes a developer unit 24 to provide charged toner particles which are electrostatically attracted to the charged image forming a toner powder image on the photoconductive surface 16, which is transferred to a copy sheet 26 at transfer station D. The copy sheet with the toner image is then transported to fusing station E where the loose toner particles are heated and fused to the copy sheet by, for example, a heated roll fuser 28 after which the copy sheet is collected in catch tray 30. Invariably, after the copy sheet is separated from the drum some residual toner particles as well as other debris may remain on the drum surface which are removed from the drum at cleaning Station F by cleaning blade 32. Subsequent to cleaning, the drum surface may be discharged by a flood lamp 34 to dissipate any residual charge remaining to complete preparation of the drum surface for the next imaging cycle. It will be understood that all operations in this printing sequence are sequentially timed, including the transport of a copy sheet and any document through the system and that the schematic of FIG. 1 is only representative and that for example the imaging drum could be substituted by an endless belt.

Figure 2A:
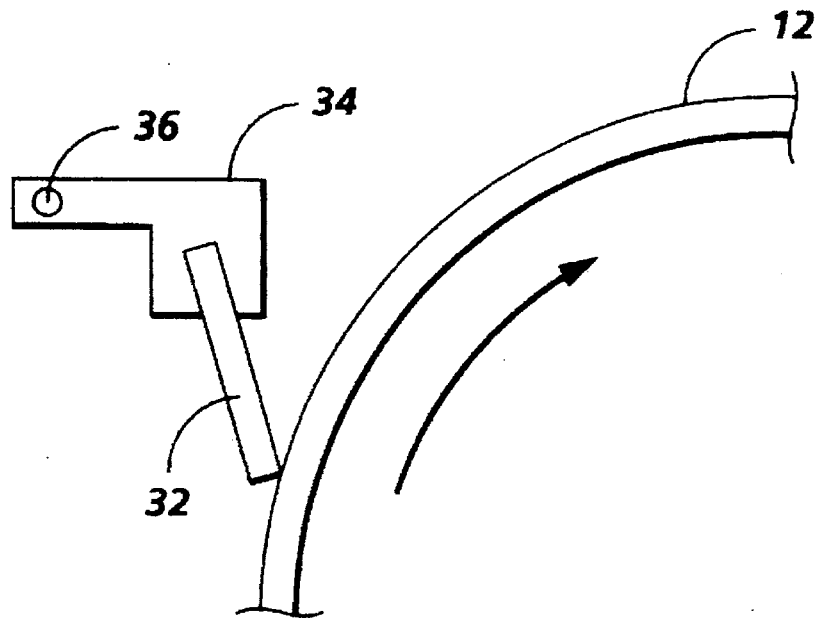
FIGS. 2A and 2B are representations of a cleaning blade application in a chisel cleaning mode and a wiping cleaning mode respectively.
Figure 2B:
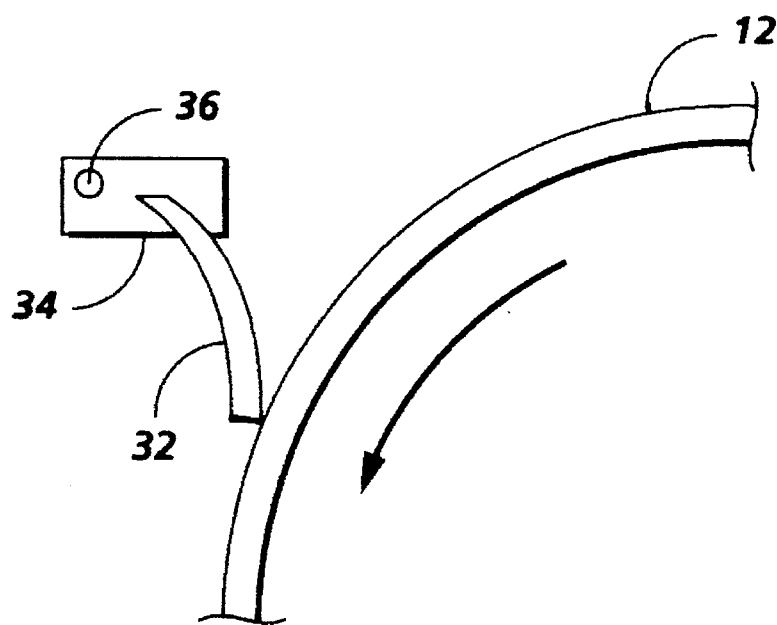

FIGS. 2A and 2B illustrate a cleaning blade 32 mounted in a chiseling and wiping orientation respectively in a blade holder 34 which is pivotally mounted to the printing machine frame about pin 36.

According to the present invention a novel polyurethane elastomer is provided which has improved mechanical properties and in particular has improved high wear resistance and low compression set. This is achieved by carefully selecting the reactive constituents used to fabricate the elastomer and particularly the type and amount of crosslinking agents used.

Polyurethane elastomers are typically produced by the reaction of a polyisocyanate and a polyether containing hydroxyl groups according to the general reaction:

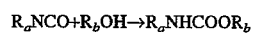

In the practice of the present invention the polyurethane elastomer is made by the reaction of a polytetramethylene ether glycol forming the base polymer chain which has the formula $HO[(CH_2)_4O]_nH$ wherein n is from about 8 to about 41 providing a molecular weight range of the order of from 650 to 2,900. In a preferred embodiment, wherein the overall mechanical properties including resiliency, hardness, compression set as well as toughness are relatively stable over a range of temperature and relative humidity distributions normally encountered in an office environment n is between 39 and 41. Within this higher range of molecular weights of the glycol a relatively soft segment is provided in the polyurethane elastomer enabling a high level of resiliency over a relatively broad temperature range. The preferred polytetramethylene ether glycols are those having molecular weights near the higher end of the stated range and in particular the polyether glycol Terathane™ 2900 available from E.I. DuPont de Nemours, Inc. which has a molecular weight of about 2900.

The diisocyanate is selected from the group consisting of diphenylmethane diisocyanates, toluene diisocyanates, naphthalene diisocyanates and blends thereof and is used in amounts of from about 20 to about 95 parts by weight per 100 parts by weight of the glycol. The functional NCO groups of the diisocyanate provide a relatively hard and rigid segment in the final polymer chain and act very much like a filler to provide a tough but flexible structure that has both hard and soft domains. Typical diisocyanates useful in the practice of the present invention include 4,4' diphenylmethane diisocyanate, 2,4' diphenylmethane diisocyanate, 2,2' diphenylmethane diisocyanate, 2,4-toluene diisocyanate, 2,6-toluene diisocyanate and naphthalene 1,5-diisocyanate as well as blends and mixtures thereof. A particularly preferred blend of diisocyanates is one containing 98 percent 4,4' diphenylmethane diisocyanate and 2 percent 2,4' diphenylmethane diisocyanate available under the designation Isocyanate™ 125M from Dow Chemical Company, Midland, Mich.

In a preferred embodiment, with the preferred higher molecular weight glycols, the diisocyanate or blend thereof is present in an amount of from about 22 to 26 parts by weight per 100 parts by weight of the glycol to provide the stoichiometric amount for the reaction to go to completion.

The optimization of the mechanical properties, and in particular, the achievement of high wear resistance with low compression set is attained according to the practice of the present invention by the selection of the type and amount crosslinking agents. Both bifunctional and trifunctional crosslinking agents are used in the practice of the present invention in a weight ratio of from about 60% to 40%, to 75% to 25% of bifunctional to trifunctional agents. The bifunctional agents have been found to provide a higher toughness, provide more chain extension in that they tend to linearly link the chain thereby providing a long, generally flexible glycol chain interrupted by the rigid Isocyanate units. The trifunctional crosslinkers tend to provide two ends of functionality as well as a 90 degree oriented functional member which crosslinks to other chains prohibiting the chains to slide by each other and thereby minimizing the compression set and tensile set properties. Accordingly, the appropriate bounds between hard and soft sites in the polyurethane elastomer is obtained by selecting the bifunctional and trifunctional crosslinking agents in the appropriate ratio. Typically, the bifunctional crosslinking agents take the formula $HO(R_1)OH$ where $R_1$ is a straight or branched chain alkyl group having from 2 to 12 carbon atoms and the trifunctional crosslinking agent is taken from the formula: $R'-C-[(OH)_a(CH_2OH)_b]$ where $R'$ is $H$, $CH_3$ or $C_2H_5$, a is 0 or 1, b is 2 or 3 and a+b=3. Typical bifunctional diols include ethylene glycol, 1,4 butanediol, 1,3 butanediol 1,6 hexanediol and neopentyl glycol and typical trifunctional triols include trimethylolpropane, trimethylolethane and glycerol. Particularly, preferred bifunctional crosslinking agents include 1,4 butanediol, 1,6 hexanediol and 1,3 butanediol because they extend the polymer chain linearly yielding tough wear resistant materials and particularly preferred trifunctional crosslinking agents include trimethylolpropane and trimethylolethane because they cross link the polymer chains at 90° and yield very set resistant networks. The bifunctional butanediol acts as a chain extender to extend the chain in the linear way to provide linear soft sites thereby providing the greatest toughness in the final elastomer. On the other hand, the trifunctional trimethylolpropane provides the best compression set performance because it is trifunctional and provides crosslink exchange sites to tighten up the network, thereby providing a crosslinked, three-dimensional network. An amount of combined crosslinking agents is used to provide a satisfactorily cross linked elastomer. Typically, the total amount of combined crosslinking agents is from about 4 to about 18 parts per 100 parts of the polytetramethylene ether glycol depending on the molecular weight of the glycol with more cross linking agents being used with lower molecular weight glycols. In the preferred embodiment with glycols having high molecular weight of the order of the order 2900 and smaller amounts of the diisocyanate of the order of about 22 to 26 parts by weight per 100 parts of the glycol only about 4 to 6 parts by weight of crosslinking agents is necessary because of the long glycol chain length with limited number of functional groups.

A catalyst is typically used to speed up the rate of reaction of the crosslinking and extending mechanisms to provide the cured urethane elastomers. Typical conventional catalysts performing this functioning include tin derivatives such as dibutyltindilaurate and stannous octoate; mercury derivatives such as phenylmercuric acetate and tertiary amines such as Polycat 33, Polycat 41, Polycat 70 and Polycat 77 which are used in conventional amounts, typically, a few drops in a dilute solution (2%) of the diol.

The polyurethane elastomer may be made according to any suitable procedure. For example, all the reactive ingredients including the catalyst may be added at one time or serially to a single reactor vessel to produce the polyurethane elastomer. However, this procedure results in a not very well controlled reaction in that there are two reactions taking place simultaneously; one between the glycol and the diisocyanate and the other between the reaction product of the first reaction and the mixture of crosslinking agents. Thus, formation of a prepolymer, chain extension and cross linking all occur at the same time. Accordingly, it is preferred to prepare a prepolymer of at least a portion of the glycol with at least a portion of the diisocyanate to enable the reaction of the NCO groups of the isocyanate with the OH groups of the glycol to form a long chain so that the NCO groups can't subsequently take up water and retain it in the final polyurethane elastomer presenting an ultimate problem in that it results in unpredictable properties dependent on relative humidity. The prepolymer method provides an initial low molecular weight polymeric diisocyanate and provides better contact over the polyurethane formation reaction and eliminates the formation of monomeric diisocyanate. Once the prepolymer, which is typically a viscous liquid, has been formed the mixture of crosslinking agents may be added together with the catalyst to form the polyurethane elastomer. Alternatively, the reaction may be suspended after it's initiated by freezing the reactants at a temperature of the order at 40° below zero Fahrenheit and the reaction completed at a later date by placing the frozen reactants, for example in an appropriately heated tool to make a part. Once all the reactants have been added together and the polymerization reaction has been initiated the forming polyurethane may be shaped according to any of the conventional techniques including injection molding, spin casting, flow coating, etc.

EXAMPLES

Polyurethane elastomer test samples were prepared in a one shot process from the following formula 100 parts by weight of a polytetramethylene ether glycol, DuPont Terathane™ 2900, 24 parts by weight of a mixture of 98 percent 4,4' diphenylmethane diisocyanate and 2 percent 2,4' diphenyl methane diisocyanate, Isocyanate™ 125M available from Dow Chemical Company, 3 parts by weight 1,4 butanediol available under the trademark DABCO DBO crosslinker from Air Products & Chemicals Inc., 2 parts by weight of trimethylolpropane available as RC Crosslinker TR from Wyrough and Loser, Inc., Trenton, N.J. and 1 to 5 drops of a catalyst mixture of 98 parts by weight of 1,4 butanediol and 2 parts by weight of dibutyltindilaurate.

All the ingredients were stored under nitrogen to prevent attack by atmospheric oxygen. Furthermore, each of the ingredients was stored in a jar with a molecular sieve at the bottom to absorb water and the jars placed in an oven to maintain the ingredients in a processable liquid form. The diisocyanate was stored at 40° C., the glycol, trimethylolpropane and catalyst mixture were stored at 70°–80° C. and the butanediol was stored at room temperature. Prior to mixing, the glycol which was in a beaker was degassed in a vacuum chamber for 20–30 minutes at 80° C. and the diisocyanate, also in a beaker, was degassed for 15 to 20 minutes at 80° C. The butanediol, trimethylolpropane and catalyst mixture were added to a third beaker and degassed for 20 to 30 minutes at 80° C. The butanediol, trimethylolpropane and catalyst mixture were then added to the glycol followed by the addition of the diisocyanate and hand mixed until clear, but for no longer than 30 seconds, after which the mixture was degassed in a vacuum chamber for 1 to 2 minutes to achieve approximately 1 millimeter of mercury vacuum and then poured into a heated spin caster and cured at 230° F. for 2 hours. The spin casting belt was removed from the spin caster and postcured in an oven at 230° F. for 16 hours followed by preconditioning at room temperature for 10–16 days to achieve stability before evaluation. The belt was razor cut into test samples about 0.4 inches long, 1.0 inch wide and 0.13 inches in thickness.

Additional samples were made according to the above procedure except that the ratio of the two identified cross linking agents was varied as indicated in the following table. The samples were evaluated for wear and compression set with the following results:

| BDO/TMP ratio | Wear mg. | Compression Set |
|---|---|---|
| 100/0 | 12 mg. | 26% |
| 60/40 | 17 mg. | 17% |
| 50/50 | 20 mg. | 12% |
| 0/100 | 27–30 mg. | 2% |

Figure 3:
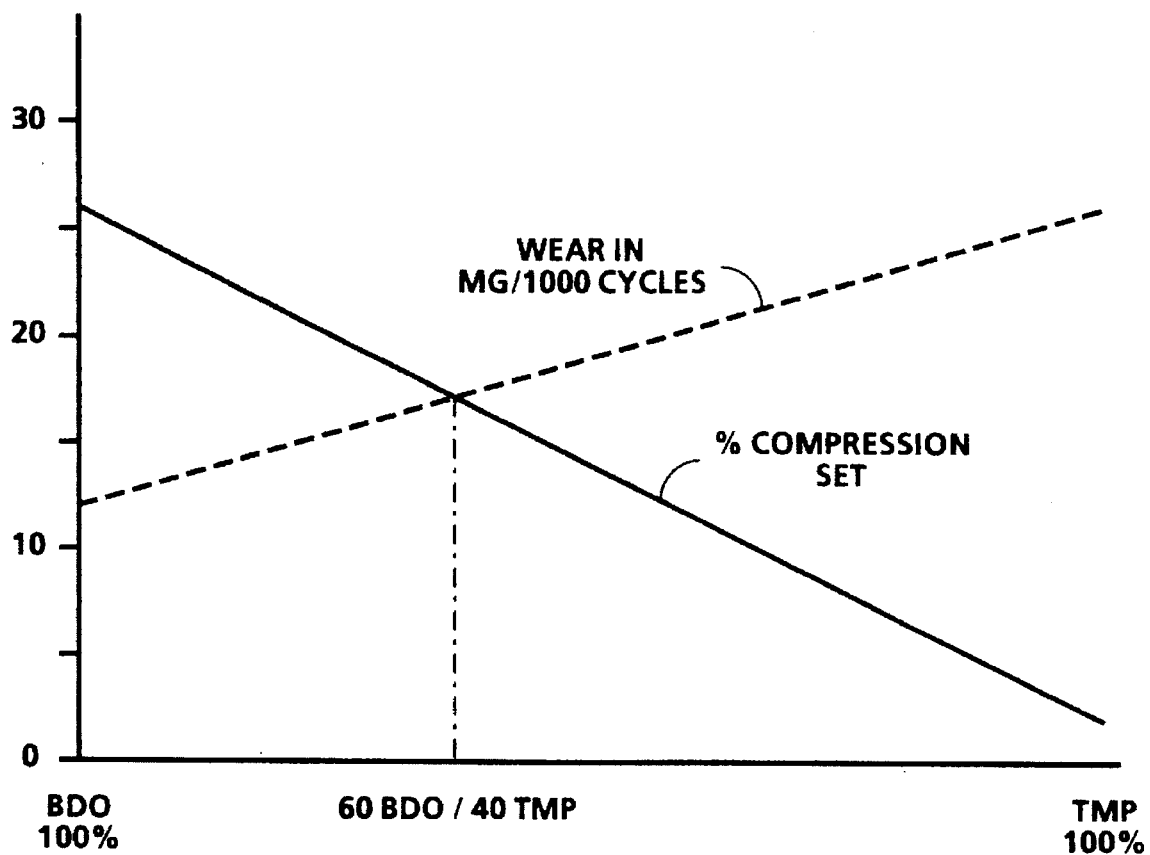
FIG. 3 is a graphical representation illustrating the optimization in compression set characteristics and wearing characteristics based on the selection and amount of crosslinking composition.

Wear was measured in weight loss in milligrams per 1000 cycles according to the Taber Abrasion Wear Test under ASTM D4060 and compression set, or percent permanent thickness change when a sample is compressed a stated amount under certain conditions and the compression force removed, was measured using ASTM D395, Method B. The overall results comparing compression set and wear with respect to the different ratios of the crosslinking agents are graphically illustrated in FIG. 3. Therein, it may be observed that the optimum balance in compression set and wear is achieved at about the 60 to 40 weight ratio of bifunctional cross linking agent to trifunctional cross linking agent.

Using a manufacturing process with a prepolymer is preferred to control heat buildup, which changes reaction rate and crosslinking uncontrollably, during fabrication by the exothermic reaction between the base glycol polymer and the diisocyanate. This permits the initial addition of only a portion of the glycol to form a prepolymer and control the heat with the subsequent addition of a final portion of the glycol to form the elastomer. We have found that when using this technique of first forming a prepolymer it is desirable to change the weight ratio of bifunctional cross linker to trifunctional cross linker from 60 to 40 to 75 to 25 to maintain the optimum balance between compression set and wear.

A prepolymer of the Terathane™ 2900 and the Isocyanate™ 125M was prepared as follows: 1000 parts by weight of the glycol which had previously been heated under vacuum at 90° C. for 2 hours to remove any moisture present and then cooled to 70° C. under nitrogen was added to 351 parts by weight of the diisocyanate. The heat of reaction will increase the temperature of the mixture to 84° C.+4° C. at which it will be held for 1 to 2 hours to ensure complete reaction. A polyurethane elastomer was prepared from the following formula 100 parts by weight of the above prepared prepolymer, 34.4 parts of the glycol, 3.4 parts of the 1,4 butanediol, 2.3 parts of the trimethylolpropane and 5 to 8 drops of the same catalyst mixture used in the one shot process. The prepolymer is stored at 80° C. and the remaining ingredients are stored as in the one shot process. The butanediol, trimethylolpropane and catalyst mixture were mixed as in the one shot process and prior to mixing all the ingredients were degassed as in the one shot process. The prepolymer was degassed in a vacuum chamber for 20 to 30 minutes at 80° C. The glycol, the mixture of the butanediol, trimethylolpropane and catalyst mixture were added to the prepolymer and hand mixed for about 30 seconds followed by degassing in a vacuum chamber for 1.5 to 2 minutes. Thereafter, the mixture was molded, cured, postcured and preconditioned as in the one shot process.

Additional evaluation in an environmental chamber shows the stability of the polyurethane elastomer according to the present invention with regard to changes in temperature and relative humidity. The samples evaluated were made according to the one shot procedure with a BDO/TMP ratio of 60/40. Evaluation over the range of temperatures from 65° F. to 85° F. and relative humidity of 15% to 65%, conditions which are inclusive of most normal office environments provided the following results.

| Conditions | Hardness Shore A | Resiliency |
|---|---|---|
| 65° F. 15% RH | 68 | 74 |
| 85° F. 65% RH | 74 | 76 |

Resiliency, the percent rebound, was measured according to ASTM D2632 and varies less than 5% and hardness varies less than 10%, it being noted that it is desirable to provide a hardness as close to 70 or slightly close as possible. The stability of resiliency is a dynamic property critical to successful functioning.

Accordingly, the present invention provides a novel polyurethane elastomer composition having high wear resistance and a low compression set and one in which it's mechanical properties remain relatively stable over a broad range of temperatures and relative humidities.

The patents and copending patent applications referred to herein are hereby specifically, totally and completely incorporated herein by reference.

While the present invention has been described with reference to specific embodiments described herein it will be apparent that many alternatives, modifications and variations may be made by those skilled in the art. Accordingly, it is intended to embrace all such alternatives and modifications as may fall within the spirit and scope of the appended claims.

We claim:

1. A polyurethane elastomer obtained by the reaction of a polytetramethylene ether glycol having the formula HO[(CH$_2$)$_4$O]$_n$H where n is from 39 to 41, and from about 22 to about 26 parts by weight per 100 parts by weight of said glycol of a diisocyanate selected from the group consisting of diphenylmethane diisocyanates, toluene diisocyanates, naphthalene diisocyanates and blends thereof and a sufficient amount of chain extenders and crosslinking agents to provide a crosslinked elastomer, said chain extenders and crosslinking agents comprising a mixture of from about 75 to 60% weight of a diol chain extender having the formula HO(R$_1$) OH where R$_1$ is a straight or branched chain alkyl group having from 2 to 12 carbon atoms and from about 25 to 40% of a triol crosslinker having the formula:

$$R'\text{---}C\text{---}[(OH)_a(CH_2OH)_b]$$

where R' is H, CH$_3$ or C$_2$H$_5$, a is 0 or 1, b is 2 or 3 and a+b=3.

2. The polyurethane of claim 1 wherein the elastomer is prepared by adding all the recited reactive constituents and cross linking agents to a reaction vessel at the same time.

3. The polyurethane of claim 1 wherein the elastomer is prepared by first forming a prepolymer of the polytetramethylene ether glycol and the diisocyanate followed by the addition of both cross linking agents to the prepolymer.

4. The polyurethane of claim 1 wherein the elastomer is formed from a mixture of cross linking agents of about 75% by weight of 1,4 butanediol and 25% by weight trimethylolpropane.

5. The polyurethane of claim 1 wherein the elastomer is formed from a mixture of cross linking agents of from about 60% by weight 1,4 butanediol and 40% by weight trimethylolpropane.

6. The polyurethane of claim 1 wherein said diisocyanate is selected from the group of diphenylmethane diisocyanates.

7. The polyurethane of claim 6 wherein said diisocyanate is a blend of 4,4'-diphenylmethane diisocyanate and 2,4'-diphenylmethane diisocyanate.

8. The polyurethane of claim 2 wherein the elastomer is formed from a mixture of cross linking agents of from about 60% by weight 1,4 butanediol and 40% parts by weight trimethylolpropane.

9. The polyurethane of claim 3 wherein the elastomer is formed from a mixture of cross linking agents of about 75% by weight of 1,4 butanediol and 25% by weight trimethylolpropane.

10. The polyurethane of claim 2 wherein the cross linking agents are a mixture of from about 60% by weight 1,4 butanediol and 40% by weight dimethylolpropane and said diisocyanate is a blend of 4,4' diphenylmethane diisocyanate and 2,4' diphenylmethane diisocyanate.

11. The polyurethane of claim 3 wherein the cross linking agents are a mixture of from about 75% by weight 1,4 butanediol and 25% by weight trimethylolpropane and said diisocyanate is a blend of 4,4' diphenylmethane diisocyanate and 2,4' diphenylmethane diisocyanate.

12. A heat cured polyurethane elastomer obtained by the reaction of a polytetramethylene ether glycol having the formula HO[(CH$_2$)$_4$O]$_n$H where n is from 39 to 41, and from about 22 to about 26 parts by weight per 100 parts by weight of said glycol of a diisocyanate selected from the group consisting of diphenylmethane diisocyanates, toluene diisocyanates, naphthalene diisocyanates and blends thereof and a sufficient amount of chain extenders and crosslinking agents to provide a crosslinked elastomer, said chain extenders and crosslinking agents comprising a mixture of from about 75 to 60% weight of a diol chain extender having the formula HO(R$_1$) OH where R$_1$ is a straight or branched chain alkyl group having from 2 to 12 carbon atoms and from about 25 to 40% of a triol crosslinker having the formula:

$$R'\text{---}C\text{---}[(OH)_a(CH_2OH)_b]$$

where R' is H, CH$_3$ or C$_2$H$_5$, a is 0 or 1, b is 2 or 3 and a+b=3.

13. The polyurethane of claim 12 wherein the reaction is solvent free.

* * * * *